Nov. 29, 1949     C. D. HILLMAN     2,489,578
TELESCOPE WITH ACHROMATIC EYELENS
Filed Dec. 16, 1944
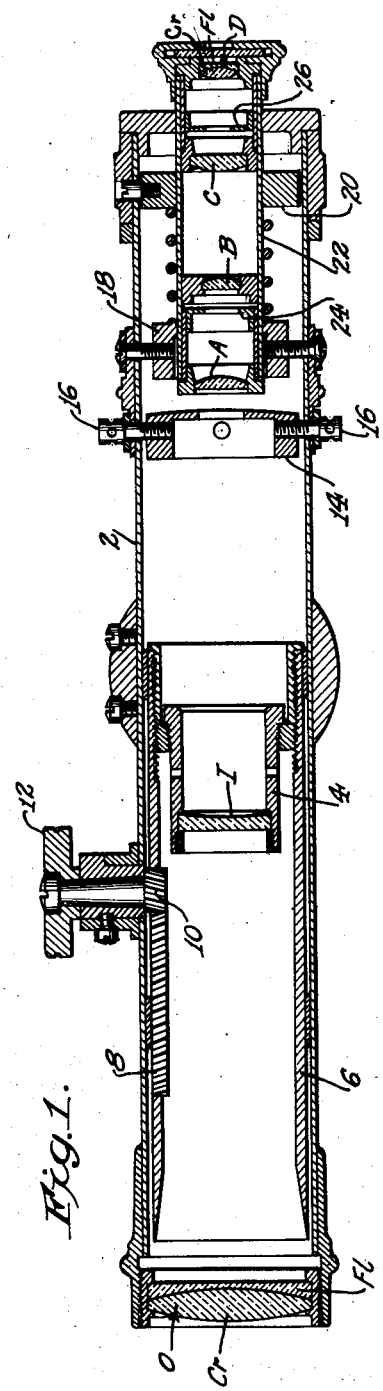
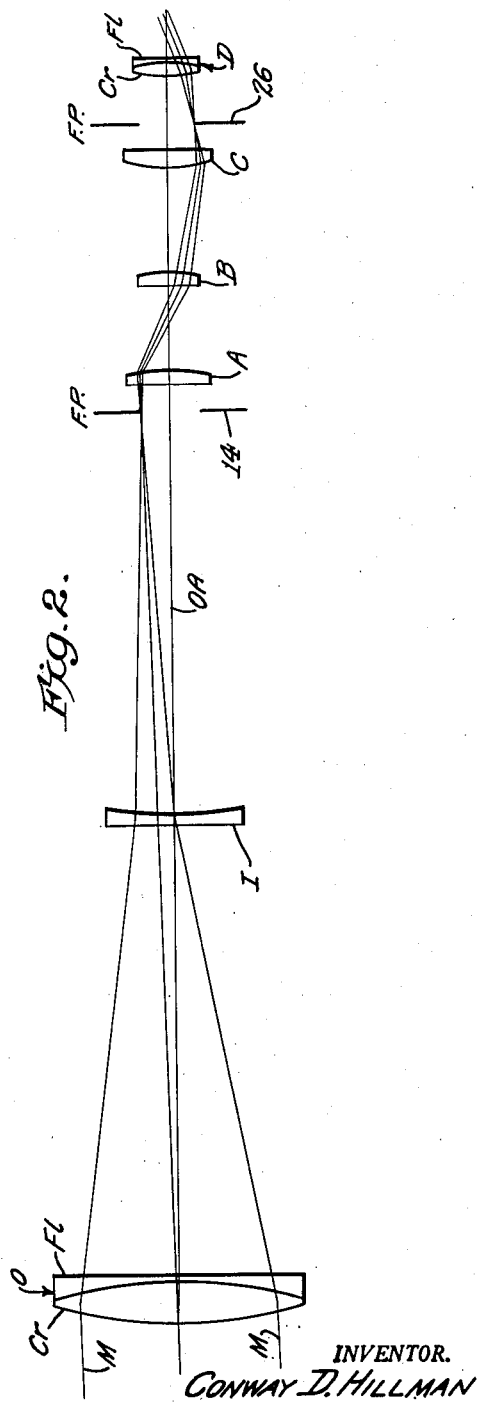
INVENTOR.
CONWAY D. HILLMAN
BY
ATTORNEY Patented Nov. 29, 1949

2,489,578

UNITED STATES PATENT OFFICE 2,489,578

TELESCOPE WITH ACHROMATIC EYE LENS

Conway D. Hillman, East Orange, N. J., assignor to Keuffel & Esser Company, Hoboken, N. J., a corporation of New Jersey Application December 16, 1944, Serial No. 568,406

2 Claims. (Cl. 88—32)

1

This invention relates to an optical system for telescopes and particularly a system which is well corrected for spherical and chromatic aberrations.

The invention will be particularly described in connection with its application to telescopes and surveying instruments although it will be recognized that the principles of the invention are applicable in many optical systems.

For surveying instruments the regular astronomical telescope with its inverted image could be used but civil engineers particularly in the United States have uniformly demanded a terrestrial or erect image telescope. This requires an objective which produces an image of a distant object and an eyepiece which can be used to view this image. In order to provide an erect image, it is necessary to use a four-lens system in the eyepiece. This increases the difficulties in getting some desired characteristics in the optical system.

Telescopes for surveying instruments are provided with reticules having cross-hairs which may include stadia hairs, diagonal hairs, etc. These hairs which may be spider web or marks on glass are in a plane and are placed in the instrument at a point which represents a focal plane where the image of a distant object can be focused.

An objective may have various aberrations which can be "corrected" or "over-corrected" in order properly to cooperate within the limitations imposed in the construction of an eyepiece or ocular. It has been the practice in telescopes, and particularly those for surveying instruments which are provided with an internal focusing lens, to overcorrect the objective system for axial aberration to take care of the axial chromatic and spherical aberration of a four single lens eyepiece. In such an optical system the focal plane of the objective was not a single plane but a series of planes for different colors of the spectrum. In such an optical system it was impossible to focus the eyepiece sharply upon the cross-hairs of a reticule placed at this point since there was no single focal plane and therefore the cross-hairs were not the desired sharp black but instead appeared gray to the eye.

In addition to the problem of gray cross-hairs because of over-correction of one portion of the system due to under-correction of the other portion of the system, there was also the problem of oblique chromatic aberration which resulted in color fringes on any object not in the center of the field. These fringes increased in progressing toward the edge of the field.

Because of the gray effect in the cross-hairs and the color fringes due to color aberration of the types above discussed, there occurred errors in measurements taken with the instrument and the accuracy of the instrument was limited because of the indistinctness of the stadia hairs and the lack of definition of the image of the object at the stadia hairs where these were used for measurements.

This invention seeks to provide an optical system having a reticule which appears as sharp black cross-hairs in the field and which also produces an image of the object which is sharp and distinct.

It is an object of the invention to provide an eyepiece for an optical system which will correct oblique chromatic aberration which exists in the focal plane of the objective.

It is a further object of the invention to provide an eyepiece with a greater eye distance without the introduction of excessive aberration.

A still further object is to provide in a telescope an optical system wherein the cross-hair has sharp definition at all points where such may appear in the field of vision.

The invention seeks to provide in an optical system good definition of the distant object and sharp black cross-hairs on a reticule by a minimum modification of basic telescope lens arrangements and particularly by changing only one single lens to an achromatic lens.

The invention also seeks to provide in an eyepiece for viewing an image having positive oblique chromatic aberration the combination of a series of three positive lenses the first of which has positive oblique chromatic aberration, the second and third negative oblique chromatic aberration and a substantially achromatic eye lens.

The invention further provides in an erecting telescope with an achromatic objective and a single focusing lens producing an image with positive oblique chromatic aberration and corrected for axial chromatic aberration, an eyepiece, comprising a series of three positive lenses the first of which has positive oblique chromatic aberration, the second and third negative oblique chromatic aberration and a substantially achromatic eye lens, said eyepiece being corrected for axial chromatic aberration.

It is also an object of the invention to provide in an erecting telescope an objective lens system corrected for axial chromatic aberration, an eyepiece corrected for axial chromatic aberration but which corrects the oblique chromatic aberration of the objective system.

The principles of the invention and the means for carrying it into effect are illustrated as applied to an erecting image internal focusing telescope provided with cross-hairs as is customary in surveying instruments.

Referring to the drawings,

Figure 1 is a view in cross-section of an internal focusing telescope constructed in accordance with the principles of this invention; and Figure 2 is a diagrammatic view showing the path followed by rays of monochromatic light parallel to each other, but oblique to the axis of the telescope through the entire system.

Referring to Figure 1 in which the invention is illustrated as applied to a telescope for a transit, there is shown a telescope tube 2 having mounted at one end an achromatic objective lens O which is a conventional compound lens comprising a double convex crown Cr and a concavo-convex flint lens Fl of suitable dimensions and curvature, more specific examples of which are given hereinafter. At an intermediate portion of the telescope tube 2 is an internal focusing lens I mounted in a suitable mount 4 for movement axially within the telescope with its draw 6 by means of a rack 8 engaged by a pinion 10 actuated by a pinion head 12. Also mounted within the telescope tube 2 is the reticule 14 which may be marks on glass or fine filaments, i. e. spider web or the like. The reticule is properly positioned within the tube by reticule adjusting screws 16.

Suitable annular members 18 and 20 serve as guides for the eyepiece draw 22. The eyepiece includes four lenses, A, B, C, and D, with properly dimensioned stops or diaphragms 24 and 26 between lenses AB and CD, respectively. Lenses A and B are both plano-convex, lens C convex-plano while lens D is a compound lens including a double convex crown (D—Cr) and a flint (D—Fl) usually made concavo-convex. Specific dimensions of these lenses and the optical properties of the glass are hereafter given in specific examples although other glass combinations could be used according to this invention.

It will be evident that the invention may be applied not only to a telescope for a transit or other surveying instruments such as levels and theodolites but is applicable to many optical systems.

The optical characteristics of the system are illustrated by the schematic showing in Figure 2 which traces the path of three rays of monochromatic light M parallel to each other, but oblique to the axis of the telescope, entering the objective. The oblique rays, as shown in Figure 2, coming from an object at infinity and below the optical axis of the system OA pass through the objective lens O and converge. The converging rays before coming to a focus pass through a dispersing lens I which is adjustable along the optical axis OA in order to bring the image of an object at any distance to a focus at a focal plane coinciding with the plane of the cross-hairs of the reticule 14.

The image that is formed at the focal plane of the objective system containing the reticule 14 is viewed by the eyepiece comprising lenses A, B, C and D. The rays from a distant object which were focused on the reticule 14 diverge toward the eyepiece lens A which refracts the diverging rays toward the axis OA and the position of the eyepiece lens B is such that the still diverging rays reach the lens B at a point on the opposite side of the axis from that at which they passed through lens A. Lens B refracts the rays so that they make a smaller angle with the axis and causes them to converge. At lens C the converging rays are further converged and brought to a focus at a focal plane to the right of lens C and at a point closer to the axis than those at which the rays entered lens C. A real image of the image at the reticule 14 is formed at the focal plane beyond the lens C and at the position of the stop 26. The image at the focal plane of the stop 26 is viewed through the eye lens D of the eyepiece. Lens D is one which will bring rays diverging from the focal plane of the limiting stop 26 into parallelism for viewing with the eye.

The foregoing, which traces the path of rays through the optical system, assumed that the rays entering the objective O were monochromatic. In the actual use of telescopes and other optical instruments the rays of light which enter the objective are heterochromatic and create problems due to the chromatic aberration of the lenses in the system.

Since the objective lens O combines both the crown lens and the flint lens it can be made achromatic and with the focusing lens I the objective system can readily be designed to provide at the reticule 14 an axial achromatic image. In prior art telescopes with four single lens in the eyepiece the objective system was not designed to give an achromatic image at the reticule 14 but was in fact over-corrected for both spherical and chromatic aberration to take care of the under-correction of the four-lens eyepiece which insofar as viewing the object was concerned produced a corrected system that was axially achromatic. As pointed out above, there was therefore no definite focal plane at the reticule 14 at which the cross-hairs could be placed to insure sharp definition. In the eyepiece with four single lenses a short eye distance was essential because any design which would increase the eye distance resulted in increasing the oblique chromatic aberration. This would be positive oblique chromatic aberration as herein defined.

It has been discovered that, by inserting into the ocular in place of the single fourth lens an achromatic doublet, the eyepiece or ocular can be axially achromatic and free from spherical aberration whereby the objective system can be designed to give an image at the reticule 14 which is corrected for axial chromatic and spherical aberration. This insures sharp definition of the cross-hairs and sharp definition of the object at least in the central portion of the field.

The focusing lens I, however, creates positive oblique chromatic aberration because the blue rays are bent farther away from the axis than the red rays. In accordance with usage among mathematical writers on optics, the oblique chromatic aberration with the red rays toward the center has been designated as plus (+) or positive and the aberration with the blue rays toward the center has been called minus (—) or negative. Whether a particular lens has positive or negative oblique chromatic aberration depends upon both its characteristics and position in the optical system. The aberration created by the focusing lens I in which a blue image is formed further from the axis than a red image is accordingly that defined as positive aberration. Therefore, at the reticule 14 the definition of the object away from the center and toward the edge of the field is not sharp. This lack of definition in the image at the reticule 14 is, however, corrected by the ocular herein described. Focusing lens I and eyepiece lens A both have positive oblique chromatic aberration while eyepiece lenses B and C each have negative oblique chromatic aberration and the several lenses can be so designed as to produce an image at the plane of the diaphragm 26 which image is free from oblique achromatic aberration. The last lens D of the ocular or eyepiece is achromatic and therefore the image at 26 may be viewed without oblique chromatic aberration.

The following two tables give examples of complete telescopes constructed according to this invention. In both tables, the data is given for a 24-power telescope. It is obvious that other telescopes and eyepieces other than those specifically set forth could be made within the principles of this invention. All dimensions given are in millimeters.

Table 1

| Lens | $N_D$ | U | Radii | Thickness or Separation | Diameter |
|---|---|---|---|---|---|
| O-Cr | 1.517 | 64.5 | $R_1 = +100.30$ | $t_1 = 6$ | 38 |
| O-Fl | 1.649 | 33.8 | $R_2 = -81.21$ | $t_2 = 5$ | 38 |
|  |  |  | $R_3 = -289.80$ | $S_1 = 123.0$ |  |
| I | 1.511 | 63.5 | $R_4 = -112.40$ | $t_3 = 3$ | 18 |
|  |  |  | $R_5 = +112.40$ | $S_2 = 80.7$ |  |
| A | 1.617 | 55.0 | $R_6 = \infty$ | $t_4 = 2$ | 9 |
|  |  |  | $R_7 = -9.14$ | $S_3 = 17.9$ |  |
| B | 1.617 | 55.0 | $R_8 = \infty$ | $t_5 = 1.5$ | 6 |
|  |  |  | $R_9 = -9.87$ | $S_4 = 23.0$ |  |
| C | 1.617 | 55.0 | $R_{10} = +12.20$ | $t_6 = 2.5$ | 11 |
|  |  |  | $R_{11} = \infty$ | $S_5 = 21.2$ |  |
| D-Cr | 1.564 | 60.7 | $R_{12} = +10.10$ | $t_7 = 1$ | 7 |
| D-Fl | 1.649 | 33.8 | $R_{13} = -6.45$ | $t_8 = 2$ | 7 |
|  |  |  | $R_{14} = -29.95$ |  |  |

Table 2

| Lens | $N_D$ | U | Radii | Thickness or Separation | Diameter |
|---|---|---|---|---|---|
| O-Cr | 1.517 | 64.5 | $R_1 = +65.80$ | $t_1 = 8$ | 38 |
|  |  |  | $R_2 = -65.80$ | $S_1 = 3.8$ |  |
| O-Fl | 1,649 | 33.8 | $R_3 = -57.37$ | $t_2 = 5$ | 38 |
|  |  |  | $R_4 = -174.80$ | $S_2 = 75.8$ |  |
| I | 1.511 | 63.5 | $R_5 = +482.60$ | $t_3 = 3$ | 15 |
|  |  |  | $R_6 = +36.02$ | $S_3 = 56.8$ |  |
| A | 1.697 | 56.1 | $R_7 = \infty$ | $t_4 = 2.0$ | 7.5 |
|  |  |  | $R_8 = -7.00$ | $S_4 = 12.9$ |  |
| B | 1.697 | 56.1 | $R_9 = \infty$ | $t_5 = 1.5$ | 6.0 |
|  |  |  | $R_{10} = -8.00$ | $S_5 = 16.9$ |  |
| C | 1.697 | 56.1 | $R_{11} = +10.10$ | $t_6 = 2.0$ | 9.0 |
|  |  |  | $R_{12} = \infty$ | $S_6 = 15.3$ |  |
| D-Cr | 1.572 | 57.4 | $R_{13} = +6.75$ | $t_7 = 2.0$ | 5.0 |
| D-Fl | 1.649 | 33.8 | $R_{14} = -4.85$ | $t_8 = 1.0$ | 5.0 |
|  |  |  | $R_{15} = -29.95$ |  |  |

It will thus be seen that this invention provides an erecting image telescope system with a minimum number of achromatic lenses which is corrected for both axial chromatic and spherical aberration and for oblique chromatic aberration. With these corrections, telescopes or other related optical systems having reticules are greatly increased in value because of the improved definition of the object and the reticule markings.

I claim:

1. In an erecting telescope, a compound objective lens and a single negative focusing lens which combine to form an objective combination, said focusing lens lying between said compound objective lens and the focal plane of said objective combination, said objective combination producing an image at said focal plane substantially free from axial chromatic aberration but having oblique chromatic aberration, an erecting eyepiece comprising a first positive lens located near but beyond said focal plane so that it will direct an oblique ray passing through the center of said compound objective lens and through said focusing lens across the axis of the telescope, a second positive lens spaced therefrom at a point beyond that where said oblique rays from said first positive lens have crossed the axis, a third positive lens located between said second positive lens and a second focal plane, said first and second focal planes being conjugate foci of said first, second and third positive lenses in combination, said negative focusing lens and first positive lens having such characteristics and spacings as to introduce positive oblique chromatic aberration effects at the second-mentioned focal plane which is compensated by the characteristics and spacings of said second and third positive lenses which introduce the equivalent negative chromatic aberration effects at said second focal plane, an achromatic eye lens beyond the second focal plane and a reticule located at a focal plane.

2. In an erecting eyepiece for viewing an image formed in an optical system having an entrance pupil, said image having limited positive oblique chromatic aberration and corrected for axial chromatic aberration, the combination of a series of three positive single lenses and a substantially achromatic eye lens the first of which single positive lenses is located near said image so that it will direct oblique rays passing through the center of the entrance pupil across the axis of the telescope, the second of which single positive lenses is spaced therefrom at a point beyond that where said oblique rays from said first positive lens have crossed the axis, the third of which single positive lenses is located between said second positive lens and a focal plane, said image and said focal plane being conjugate foci of said first, second and third positive lenses in combination, said first positive single lens having such characteristics and spacings as to introduce positive oblique chromatic aberration efforts at said focal plane adding to the positive oblique chromatic aberration of the original image both of which positive oblique chromatic aberration effects are compensated by the characteristics and spacings of said second and third positive single lenses which introduce the equivalent negative oblique chromatic aberration effects at said focal plane, said substantially achromatic eye lens being located beyond said focal plane.

CONWAY D. HILLMAN.

REFERENCES CITED

The following references are of record in the file of this patent:

UNITED STATES PATENTS

| Number | Name | Date |
|---|---|---|
| 568,052 | Taylor | Sept. 22, 1896 |
| 967,143 | Arriaga | Aug. 9, 1910 |
| 1,091,933 | Humbrecht | Mar. 31, 1914 |
| 1,130,468 | Bierbrauer et al. | Mar. 2, 1915 |
| 1,195,353 | Grebe | Aug. 22, 1916 |
| 1,395,822 | Hastings | Nov. 1, 1921 |
| 1,468,762 | Taylor et al. | Sept. 25, 1923 |
| 1,863,099 | Bowen | June 14, 1932 |
| 2,237,943 | Lithotzky | Apr. 8, 1941 |
| 2,430,549 | Altman | Nov. 11, 1947 |

FOREIGN PATENTS

| Number | Country | Date |
|---|---|---|
| 8,837 | Great Britain | May 3, 1895 |
| 17,843 | Great Britain | of 1897 |
| 98,250 | Germany | July 7, 1898 |
| 162,692 | Great Britain | Apr. 25, 1921 |
| 166,575 | Great Britain | July 11, 1921 |
| 303,787 | Great Britain | Nov. 28, 1928 |
| 322,460 | Great Britain | Dec. 4, 1929 |
| 509,279 | Great Britain | July 13, 1939 |

OTHER REFERENCES

Edser: Light for Students; reprinted 1944; page 212, 4th paragraph from top. Reprint published by MacMillan and Co., St. Martin Street, London (Edser's original edition in 1902).

Certificate of Correction

Patent No. 2,489,578            November 29, 1949

CONWAY D. HILLMAN

It is hereby certified that error appears in the printed specification of the above numbered patent requiring correction as follows:

Column 6, line 31, for the word "efforts" read *effects*;

and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*